UNITED STATES PATENT OFFICE.

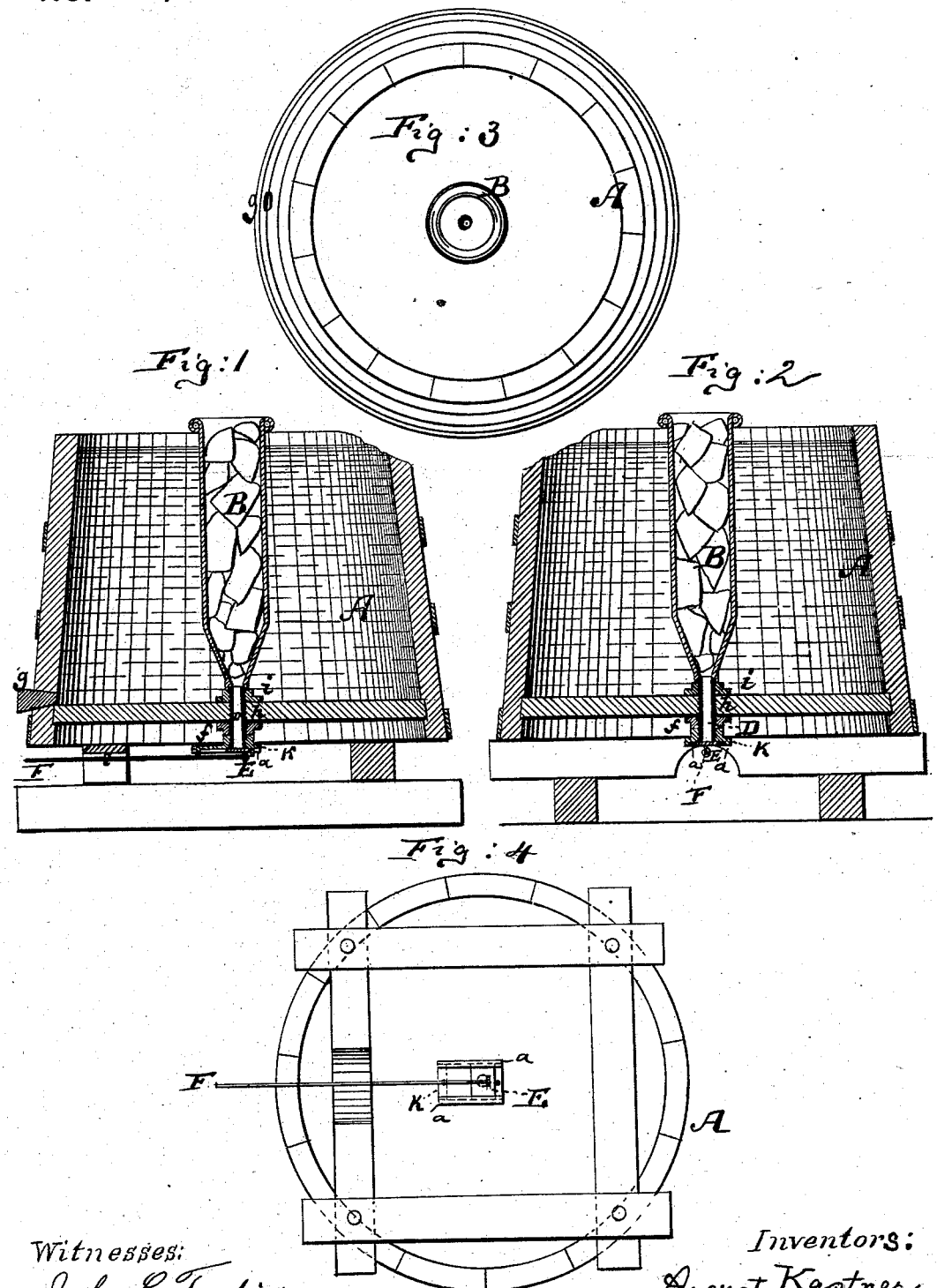

AUGUST KASTNER AND CHARLES KUNZ, OF NEWARK, NEW JERSEY.

COOLER FOR FERMENTING-VATS.

SPECIFICATION forming part of Letters Patent No. 237,545, dated February 8, 1881.

Application filed June 25, 1880. (No model.)

*To all whom it may concern:*

Be it known that we, AUGUST KASTNER and CHARLES KUNZ, of Newark, in the county of Essex and State of New Jersey, have invented a new and Improved Cooler for Fermenting-Vats, of which the following is a specification.

Heretofore the ordinary method of keeping beer cool during fermentation has been to float vessels containing ice upon the surface of the beer. The objections to this are that the cooling is not uniform thoughout; that the beer is agitated by the vessels floating upon it, especially when it becomes necessary to renew the ice; and that there is no way of drawing off the water produced by the melting ice without taking the vessels out of the vat, draining off the water, and replacing the vessels—a clumsy process, and one calculated to disturb the beer, which should be kept perfectly quiet.

The object of our invention is to avoid the inconvenience above stated and to keep the beer cool by a method which allows it to remain quiet, even when the ice is removed or renewed, or when the water produced by melting is drawn off. We attain this object by the instrumentalities hereinafter described.

In the accompanying drawings, Figure 1 is a vertical central section of a beer-vat embodying our improvements. Fig. 2 is a vertical cross-section of the same. Fig. 3 is a top view of the vat, and Fig. 4 is a bottom view of the vat.

A represents the fermenting-vat, which is constructed with a hole, $g$, in the side, through which the beer may be discharged, and with an orifice, $h$, in the bottom, through which passes the drain-pipe D. This drain-pipe extends above and below the vat-bottom, and is clamped in its position by the flanged nuts $f$ and $i$, respectively screwed upon it above and below the bottom of the vat, or the pipe may be secured in its position in any other effectual manner.

Upon the upper part of the drain-pipe D is screwed or otherwise secured in an upright position the ice-box B, which is a hollow receptacle, tapering at the end, set on the drain-pipe D, having a lower discharge-opening which meets and fits the pipe-opening, leaving a continuous passage through.

The ice-box should be of sufficient size to contain enough ice to keep the beer in the vat cool and high enough, when in position, to have its upper rim above the level of the beer in the vat.

Upon the lower end of the drain-pipe D, below the lower fastening-nut, $f$, the perforated plate K is secured so that its perforation comes opposite to the pipe-hole. Upon this perforated plate K, in grooves $a\ a$, moves the slide E. This slide E operates to close the drain-pipe when pushed under it, and to open the pipe when pulled away by the rod F, allowing the water formed by the melting of the ice to drain off.

The grooves $a\ a$ may be of any form adapted to hold the slide or valve. Instead of said slide, a turning plate or ordinary valve may be used.

The practical operation of our apparatus is as follows: In a vat constructed with the bottom opening, $h$, and with the drain-pipe D passing through this opening, and with a slide, E, for the pipe, all of substantially the form and adjustment above described, the ice-box B is set upon the top of the drain-pipe, and screwed fast thereto, as shown. The beer is then admitted into the vat. Ice may then, or before the admission of the beer, be placed in the ice-box B to keep the beer cool, and when the ice has melted the water and sediment may be allowed to run off through the drain-pipe D by drawing the slide E off from the bottom opening of the drain-pipe by the rod F, pushing it back when the draining is finished. The water, in running off, carries with it the impurities derived from the melted ice, and closes the bottom of the ice-box and the drain-pipe itself.

It is obvious that in this way the ice in the stationary ice-box may be removed or renewed, or the ice-box and pipe cleaned, without causing any disturbance of the beer.

Having thus described our invention in the form which we have hitherto found most convenient, what we desire to claim and secure by Letters Patent is—

The combination of the open vat A, having outlet $g$, with the ice-tube B extending above the top of the vat, with the drain-pipe D to which the ice-tube B is removably secured, and with the valve E, substantially as and for the purposes described.

AUGUST KASTNER.
CHARLES KUNZ.

Witnesses:
WILLY G. E. SCHULTZ,
HARRY M. TURK.